Figure 1:
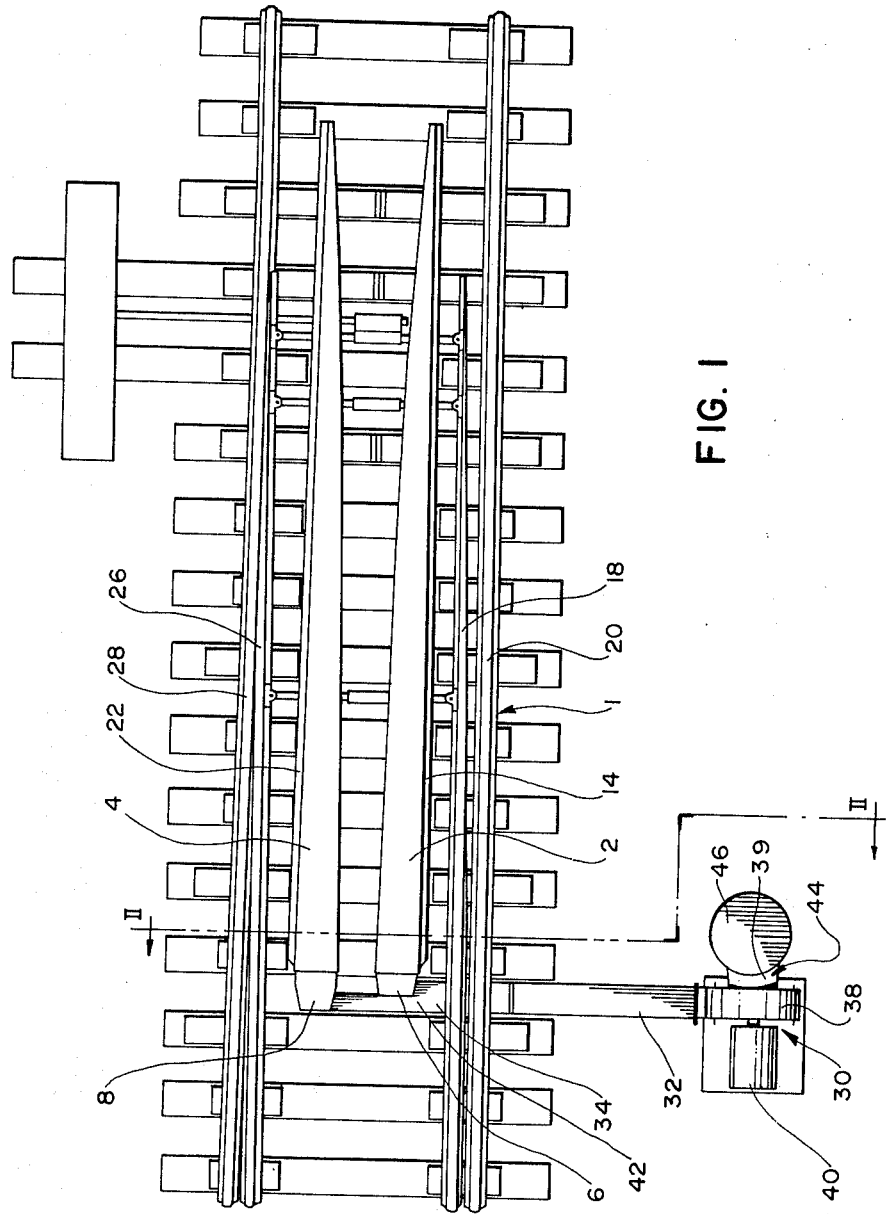

United States Patent [19]

Ringer

[11] 3,972,497

[45] Aug. 3, 1976

[54] APPARATUS FOR PRODUCING SNOW DEFLECTING AIR CURTAINS FOR RAILWAY SWITCHES

[75] Inventor: Thomas R. Ringer, Ottawa, Canada

[73] Assignee: Canadian Patents and Development Limited, Ottawa, Canada

[22] Filed: Dec. 18, 1974

[21] Appl. No.: 533,775

[52] U.S. Cl. .............................. 246/428; 104/279
[51] Int. Cl.² ........................................ E01B 7/00
[58] Field of Search ................. 246/428; 104/279; 239/502, 553.5, 598; 126/271.2 B

[56] References Cited
UNITED STATES PATENTS

| | | | |
|---|---|---|---|
| 1,298,891 | 4/1919 | Chausse | 246/428 |
| 1,718,271 | 6/1929 | Adams | 246/428 |
| 2,812,980 | 11/1957 | Kadosch et al. | 239/502 |
| 2,894,704 | 7/1959 | Bone | 246/428 |
| 3,223,835 | 12/1965 | Cherry et al. | 246/428 |
| 3,697,746 | 10/1972 | Patterson et al. | 246/428 |

FOREIGN PATENTS OR APPLICATIONS

| | | | |
|---|---|---|---|
| 837,748 | 6/1960 | United Kingdom | 246/428 |

*Primary Examiner*—L. J. Paperner
*Assistant Examiner*—Randolph A. Reese
*Attorney, Agent, or Firm*—Francis W. Lemon

[57] ABSTRACT

An apparatus for producing snow deflecting air curtains for a railway switch comprising one (or two side-by-side) ducts along the center of the railway switch and having nozzle slits for directing snow-deflecting air curtains in opposite directions over each pair of rails consisting of one fixed and one movable rail. The duct internal cross-section tapers so that air passes therealong at a more or less constant velocity from an air blower connected to the conduit. The air curtains issue from the nozzle slits at at least one hundred feet per second and preferably travel along a path which inclines upwardly from the horizontal about 5°.

1 Claim, 3 Drawing Figures

APPARATUS FOR PRODUCING SNOW DEFLECTING AIR CURTAINS FOR RAILWAY SWITCHES

This invention relates to apparatus for producing snow deflecting air curtains for railway switches.

In the winter operation of railway systems the failure of railway track switches due to the presence of snow is a well known problem.

Railway track switches are presently protected against failure from snow or ice by manual cleaning, by thermal methods, e.g. electrical heating, combustion heating including radiant, convective and conductive heat transfer, by pneumatic methods, e.g. high pressure compressed air is discharged at periodic intervals to remove snow from critical areas, and by enclosure within structures to protect the switch from the elements.

Manual cleaning of railway track switches is not acceptable in remote locations or even in yards and terminals since it is expensive and may be dangerous to personnel. Thermal methods of protecting railway track switches are expensive in both capital, operating and maintenance costs, in addition to which they have tended to be unreliable. Heating may be disadvantageous since it can result in soft ballast, switch burnout and drainage problems. The enclosure of a railway track switch by a building requires a lengthy expensive structure.

For compressed air discharged at intervals it has been proposed in, for example, U.S. Pat. No. 2,898,062, dated Aug. 4, 1959, O. F. Magnus, to provide a pneumatic blower including manifolds adapted to be disposed between the stock rail and switch point on either side of the railway switch to maintain areas between the moveable and immovable rail on either side of the switch free from debris that may accumulate therein, and the arrangement is such that timed intermittent pulses of air under pressure are adapted to emit from discharge means (nozzles) provided on the manifolds. Such devices are for removing deposited snow from specified switch areas and suffer from the disadvantage that wet snow or snow that has become packed between the movable and immovable rails, by operation of the switch, cannot be removed by pulsed air from nozzles, and so the switch eventually becomes inoperable through build up of the packed snow.

It would be desirable to provide an apparatus which would substantially prevent snow depositing on specified areas of a railway switch so that the railway switch would continue to function indefinitely during snow precipitation.

It is an object of the present invention to provide an apparatus for producing snow deflecting air curtains which substantially prevents snow depositing on specified areas of a railway switch so that the railway switch will continue to function indefinitely during snow precipitation.

According to the present invention there is provided an apparatus for producing snow deflecting air curtains for a railway switch, comprising:

a. elongated duct means having air inlet means and extending along a central portion of the railway switch, the duct means having air passage means extending therealong which decreases in cross-sectional area in a lengthwise direction from the air inlet means, b. a first nozzle means attached to, and having an elongated nozzle orifice extending along, a first side of the duct means for directing a first snow deflecting air curtain over and across a first movable rail adjacent the first side of the duct means, and over and across a portion of a first immovable rail adjacent the first movable rail, of the railway switch, c. a second nozzle means attached to, and having an elongated nozzle orifice extending along, a second side of the duct means for directing a second, snow deflecting air curtain over and across a second movable rail, adjacent the second side of the duct means, and over and across a portion of a second immovable rail adjacent the second movable rail, of the railway switch, and d. air supply means connected to the air inlet means, for supplying pressurized air, by means of the duct means, to the first and second nozzle means to cause the first and second, snow deflecting air curtains to issue from the elongated nozzle orifices at a velocity of at least one hundred feet per second.

Figure 2:
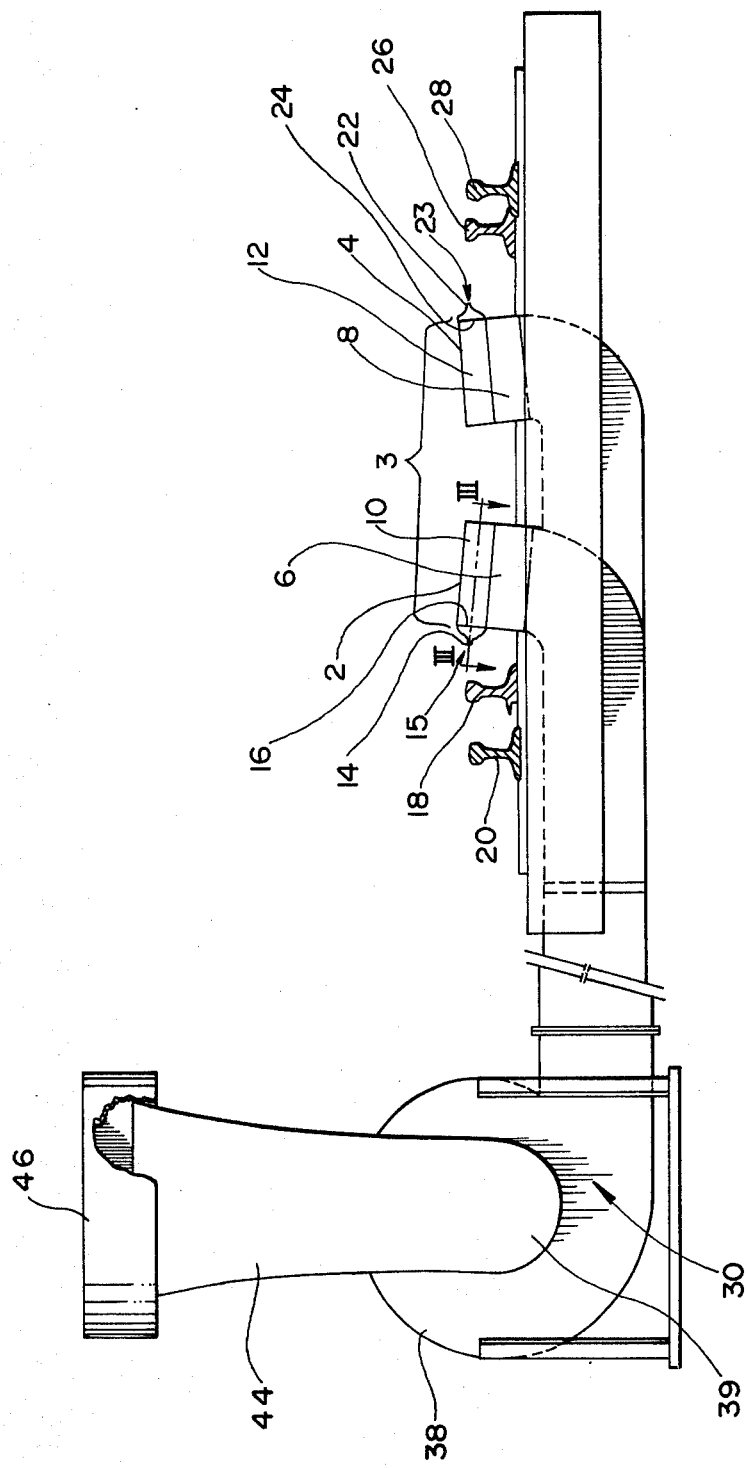
Figure 3:
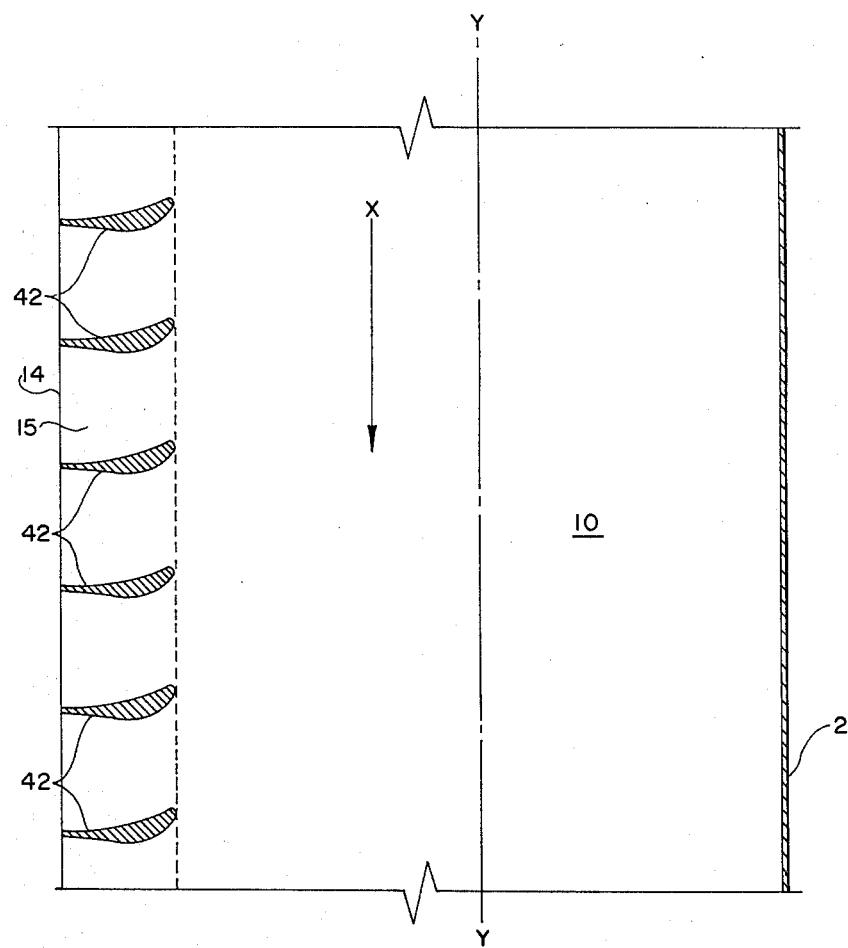

In the accompanying drawings which illustrate, by way of example, an embodiment of the present invention, FIG. 1 is a plan view of a railway switch having an apparatus for producing snow deflecting air curtains, FIG. 2 is a sectional end view along II-II, FIG. 1, and FIG. 3 is an enlarged, sectional plan view, of a portion of a duct, along III—III, FIG. 2, showing turning vanes in the duct.

Referring to FIGS. 1 to 3 there is shown a railway switch 1 having an apparatus for producing snow deflecting air curtains therefor, comprising:

a. elongated duct means 3, in the form of ducts 2 and 4 extending side-by-side, each having air inlet means in the form of air inlets 6 and 8 and extending along a central portion of the railway switch 1. The ducts 2 and 4 have air passage means extending therealong in the form of air passages 10 and 12 respectively. The air passages 10 and 12 decrease in cross-sectional area in a lengthwise direction from the air inlets 6 and 8 respectively.

b. a first nozzle means, in the form of nozzle 14, attached to, and having an elongated nozzle orifice 15 extending along, a first side of the duct means 3, that is outer side 16 of duct 2, for directing a first, snow deflecting air curtain over and across a first movable rail 18, adjacent the side 16, and over and across a portion of a first immovable rail 20 adjacent the first movable rail 18, of the railway switch 1, c. a second nozzle means, in the form of a nozzle 22, attached to, and having an elongated nozzle orifice 23 extending along, a second side of the duct means 3, that is outer side 24 of duct 4, for directing a first, snow deflecting air curtain over and across a second movable rail 26, adjacent the side 24, and over and across a portion of a second immovable rail 28 adjacent the second movable rail 26, of the railway switch 1, and d. air supply means, in the form of a centrifugal blower assembly 30, connected to the air inlets 6 and 8 by crossducts 32 and 34, for supplying pressurized air by means of the ducts 2 and 4 to the nozzles 14 and 22, respectively, to cause the first and second, snow deflecting air curtains to issue from the elongated nozzle orifices 15 and 23, respectively at a velocity of at least one hundred feet per second.

The railway track switch 1 is a typical twenty two foot long track switch and the entire length from point to heel need not be protected from falling or drifting snow. Thus, as shown in FIG. 1, the ducts 2 and 4 do not extend the full length of the railway track switch 1. The ducts 2 and 4 do not project above the first and second movable rails 18 and 26 more than the permissible two inches for any equipment between rails and they must not infringe on the flangeway allowances. The air passages 10 and 12 decrease in cross-sectional area in a lengthwise direction, from the air inlets 6 and 8 respectively, so that the air issues from the elongated nozzle orifices 15 and 23 at a substantially constant velocity along the whole length of the ducts 2 and 4. Ideally the ducts 2 and 4 and the nozzles 14 and 22 should be mounted a reasonable distance above the first and second movable rails 18 and 26 but because of the above mentioned restrictions on the height of the ducts 2 and 4, the height of the nozzles 14 and 22 is restricted to substantially the height of the first and second movable rails 18 and 26. To accommodate the height restriction in this embodiment of the present invention the ducts 2 and 4, and thus the nozzles 14 and 22, are inclined upwardly at an angle in the range 4° to 6°, preferably about 5°, to the horizontal in a direction towards the first and second movable rails 18 and 26 respectively, so that the first and second, snow deflecting air curtains issue from the elongated nozzle orifices 15 and 23 along paths inclined upwardly to the horizontal at an angle in the range 4° to 6°, preferably about 5°, towards the first and second movable rails 18 and 26 respectively. Thus the snow deflecting air curtains will issue from the first and second elongated nozzle orifices 15 and 23 along paths inclined upwardly to the horizontal at an angle in the range 4° to 6° towards the respective first and second movable rail over which that snow deflecting air curtain will pass.

The rate of decay of each snow deflecting air curtain is a function of the distance from the nozzle orifice 15 or 23 from which that air curtain issues, and the dimensions of that nozzle orifice 15 or 23. The thicker the air curtain is issuing from the nozzle orifices 15 and 25 the less decay there is in the air curtain at any distance from the nozzle orifice 15 or 25, but then the power required to generate the air curtain is greater. Thus an optimum must be reached between power requirement to generate the air curtains and the width of the nozzle orifices 15 and 25. In the embodiment shown in FIGS. 1 to 3 this optimum was achieved using nozzle orifices 15 and 25 having a width of 0.100 ins.

The centrifugal blower assembly 30 comprises a centrifugal air blower 38 and an electric motor 40 coupled thereto. The centrifugal blower 38 has a low velocity air, re-entrant inlet 39 which is well above predictable levels of snow accumulation and drifting snow. The inlet 39 comprises a conduit 44 extending upwardly from the air blower 38 and an oversize cap 46 over and spaced from an upper inlet end of the conduit 44 to provide the re-entrant path for air and to retard the deposition of snow in the conduit 44. The crossduct 34 reduces in internal cross-section to substantially one half of the original internal cross-section, at the position 40 where air enters the duct 2, so that pressurized air from the centrifugal air blower 38 is fed at substantially the same rate to the ducts 2 and 4.

FIG. 3 shows sectioned portion of duct 2 and nozzle 14 revealing turning vanes 42 fitted in the nozzle 14 and extending upwardly across the elongated nozzle orifice 15. Turning vanes 42 are equally spaced along the whole length of the elongated nozzle orifice 15, and similar turning vanes are equally spaced along the whole length of the elongated nozzle orifice 23 (FIG. 2). The turning vanes 42 are aerodynamically shaped with respect to the direction X at which air passes along the air passage 10 of the duct 2, so that the snow deflecting air curtain issues substantially at right angles to the longitudinal axis Y—Y of the elongated nozzle orifice 15.

In operation the electric motor 40 is energized to drive the centrifugal air blower 38 so that pressurized air is fed to the air passages 10 and 12 and passes along the ducts 2 and 4. The air passing along the ducts 2 and 4 is directed by the turning vanes 42 to issue from the elongated nozzle orifices 15 and 23, as previously described, substantially at right angles to the longitudinal axis of the elongated nozzle orifices 15 and 23, and form snow deflecting air curtains over and across the first and second movable rails 18 and 26 and the immovable rails 20 and 28.

By the air issuing from the elongated nozzle orifices 15 and 23 at an angle, inclined upwardly to the vertical, in the range 4° to 6°, preferably 5°, the snow deflecting air curtains will have an entrained snow particles trajectory which results in the deposition of the snow particles outside the area of the railway switch that is to be protected.

In different embodiments of the present invention a single duct is used and the nozzles 14 and 24 are along opposite sides of the single duct and both receive pressurized air from a common air passage along the single duct.

In other, different embodiments of the present invention the air inlet to a duct is at a central position along the length of the duct and the duct tapers in internal cross-section in both directions from the air inlet.

In yet another, different embodiment of the present invention, the spacings between the turning vanes 42 decrease in magnitude away from the air inlet to the duct to further ensure that the velocity of the air of the snow deflecting air curtain is substantially the same along the length of the duct.

In some instances it may be desirable to mount the two ducts for movement with their respective movable rail so that the nozzles do not need to be spaced from the movable rails the distance of movement of the latter.

In different embodiments of the present invention the overall cross-sectional dimensions of a duct are constant along the length of the duct, and the interior of the duct reduces in cross-section by means, of, say, a partition along the duct interior which increases in cross-section in a lengthwise direction from the air inlet.

I claim:
1. Apparatus for producing snow deflecting air curtains for a railway switch, comprising:
   a. elongated duct means having air inlet means and extending along a central portion of the railway switch, the duct means having air passage means extending therealong which decreases in cross-sectional area in a lengthwise direction from the air inlet means,
   b. a first nozzle means attached to, and having an elongated nozzle orifice extending along, a first side of the duct means for directing a first, snow deflecting air curtain over and across a first mov- able rail adjacent the first side of the duct means, and over and across a portion of a first immovable rail adjacent the first movable rail, of the railway switch, c. a second nozzle means attached to, and having an elongated nozzle orifice extending along, a second side of the duct means for directing a second, snow deflecting air curtain over and across a second movable rail, adjacent the second side of the duct means, and over and across a portion of a second immovable rail adjacent the second movable rail, of the railway switch, and d. air supply means connected to the air inlet means, for continuously supplying pressurized, unheated air, by means of the duct means, to the first and second nozzle means to cause the first and second, snow deflecting air curtains to issue continuously from the elongated nozzle orifices at a velocity of at least one hundred feet per second, and wherein, e. the first and second nozzle means are inclined upwardly at an angle in the range 4° to 6° to the horizontal in a direction towards the first and second movable rails respectively, so that each of the first and second snow deflecting air curtains will issue from the respective elongated nozzle orifice along a path inclined upwardly at an angle in the range 4° to 6° to the horizontal in a direction towards the respective first and second movable rail over which that snow deflecting air curtain will pass and result in the deposition of snow particles outside the area of the railway switch that is to be protected.

* * * * *